United States Patent
Funck et al.

(10) Patent No.: US 11,703,078 B2
(45) Date of Patent: Jul. 18, 2023

(54) FIBER COMPOSITE STRUT

(71) Applicant: Albany Engineered Composites, Inc., Rochester, NH (US)

(72) Inventors: Ralph Funck, Kaiserslautern (DE); Martin Welsch, Henschtal (DE)

(73) Assignee: Albany Engineered Composites, Inc., Rochester, NH (US)

( * ) Notice: Subject to any disclaimer, the term of this patent is extended or adjusted under 35 U.S.C. 154(b) by 389 days.

(21) Appl. No.: 16/811,136

(22) Filed: Mar. 6, 2020

(65) Prior Publication Data

US 2020/0282664 A1    Sep. 10, 2020

(30) Foreign Application Priority Data

Mar. 8, 2019   (DE) ........................ 10 2019 001585.1

(51) Int. Cl.
| | |
|---|---|
| *F16C 7/02* | (2006.01) |
| *F16D 1/06* | (2006.01) |
| *B29C 70/86* | (2006.01) |
| *F16D 1/072* | (2006.01) |

(52) U.S. Cl.
CPC .............. *F16C 7/026* (2013.01); *F16D 1/072* (2013.01); *B29C 70/86* (2013.01); *F16C 2220/28* (2013.01)

(58) Field of Classification Search
CPC ........ F16C 7/02; F16C 7/026; F16C 2220/28; F16D 1/072; B29C 70/86
See application file for complete search history.

(56) References Cited

U.S. PATENT DOCUMENTS

| | | | | |
|---|---|---|---|---|
| 3,661,670 A | * | 5/1972 | Pierpont, Jr. ......... | B29C 53/805 138/109 |
| 3,674,581 A | * | 7/1972 | Kalnin .................... | B29C 70/20 156/84 |
| 3,784,239 A | * | 1/1974 | Carter .................... | B29C 70/86 285/332.1 |

(Continued)

FOREIGN PATENT DOCUMENTS

| | | |
|---|---|---|
| DE | 10 2013 008 810 A1 | 12/2013 |
| DE | 10 2013 018 970 B3 | 2/2015 |

(Continued)

OTHER PUBLICATIONS

Machine translation of DE 102013008810 A1 obtained on Jun. 15, 2022.*

(Continued)

*Primary Examiner* — Adam D Rogers
(74) *Attorney, Agent, or Firm* — McCarter & English, LLP

(57) ABSTRACT

The invention relates to a strut, such as fiber composite struts used in aircraft or spacecraft, which has a largest possible outer diameter within a cylindrical installation space of the strut. The invention concerns an insert connected to a fiber composite hollow structure, such as a fiber plastic composite hollow structure, where the hollow structure engages an undercut of the insert, wherein the outer region of the fiber composite hollow structure likewise has an undercut and this undercut is filled with a fiber composite jacket, such as a fiber plastic composite jacket, and the inner region of the fiber composite hollow structure has, at least in one subregion, a core connected thereto.

21 Claims, 2 Drawing Sheets

(56) References Cited

U.S. PATENT DOCUMENTS

| | | | |
|---|---|---|---|
| 4,050,827 A * | 9/1977 | Jonda | B64C 27/32 403/11 |
| 4,353,268 A | 10/1982 | Picard et al. | |
| 4,652,171 A * | 3/1987 | Schutze | B29C 70/50 403/267 |
| 4,704,918 A * | 11/1987 | Orkin | F16C 7/026 464/181 |
| 4,895,351 A * | 1/1990 | Devaud | F16C 7/026 464/181 |
| 5,160,392 A | 11/1992 | Thongs, Jr. | |
| 6,379,763 B1 * | 4/2002 | Fillman | F16C 7/026 428/36.9 |
| 8,261,672 B2 | 9/2012 | Heinisch et al. | |
| 8,413,415 B2 | 4/2013 | Knappe | |
| 8,720,358 B2 * | 5/2014 | Kuhlmann | B29C 70/86 114/162 |
| 9,056,431 B2 * | 6/2015 | Bond | B29C 70/30 |
| 9,546,678 B2 * | 1/2017 | Wu | F16C 3/02 |
| 10,618,231 B2 * | 4/2020 | Lenz | B29C 70/86 |
| 11,041,585 B2 * | 6/2021 | Gill | F16L 47/12 |
| 11,067,114 B2 * | 7/2021 | Bernard | F16C 7/026 |
| 2019/0128449 A1 * | 5/2019 | Beale | F16C 7/026 |
| 2020/0400190 A1 * | 12/2020 | Funck | F16C 7/026 |
| 2021/0071707 A1 * | 3/2021 | Funck | B29D 99/0046 |

FOREIGN PATENT DOCUMENTS

| | | |
|---|---|---|
| DE | 10 2014 109 886 A1 | 1/2016 |
| DE | 10 2016 007 663 A1 | 12/2017 |
| DE | 10 2017 003 024 A1 | 10/2018 |
| EP | 0149979 A2 * | 7/1985 |
| JP | 58090917 A * | 5/1983 |
| RU | 2518378 C2 | 6/2014 |
| RU | 2520632 C2 | 6/2014 |
| WO | WO 2009/003207 A1 | 1/2009 |

OTHER PUBLICATIONS

International Search Report and Written Opinion issued by the European Patent Office, acting as the International Searching Authority, for International Application PCT/US2020/021335 dated Jun. 16, 2020.

Fu, Shao-Yun et al.: "Chapter 1—Introduction to short fibre-reinforced polymer composites", *Science and Engineering of Short Fibre-Reinforced Polymer Composites* (*Second Edition*), Woodhead Publishing Series in Composites Science and Engineering, 2019, pp. 1-7.

Khan, Md Nuruzzaman et al.: "Production and Properties of Short Jute and Short E-Glass Fiber Reinforced Polypropylene-Based Composites", *Open Journal of Composite Materials*, 2012, 2, pp. 40-47.

Pazhanivel, K. et al.: "Influence of Ni—Ti shape memory alloy short fibers on the flexural response of glass fiber reinforced polymeric composites", *SN Applied Sciences*, published on-line Jun. 26, 2019, 7 pages. See https://doi.org/10.1007/s42452-019-0823-7.

Karthikeyan, Rajashekaran et al.: "Mechanical Properties and Cross-Linking Density of Short Sisal Fiber Reinforced Silicone Composites", *BioResources*, 12(1), 2017, pp. 211-227.

Park, Su Bin et al.: "Effects of short glass fibers on the mechanical properties of glass fiber fabric/PVC composites", *Materials Research Express*, vol. 4, 2017, pp. 1-9.

* cited by examiner

FIBER COMPOSITE STRUT

CROSS-REFERENCE TO RELATED APPLICATION

This application claims the benefit of priority of German Application No. 10 2019 001585.1, filed Mar. 8, 2019. The foregoing application is incorporated herein by reference in its entirety.

FIELD OF THE INVENTION

The invention relates to a strut, or tension-compression rod, made of fiber composite material.

BACKGROUND

The use of heavy-duty fiber composite materials, e.g., with carbon fibers, glass fibers, aramid fibers, ceramic fibers, or basalt fibers, and with a matrix of, e.g., thermoset or thermoplastic material, elastomer, carbon, graphite, or ceramic, requires the use of commensurate design for force transmission that is appropriate for the material involved. "Appropriate for the material involved" in this context means that the anisotropy of the material is utilized purposefully with respect to the different mechanical properties in the fiber direction and transverse thereto.

Connecting rods made of fiber composite material for force transmission serve, in particular, for guidance and mechanical mounting, for support, for bracing, or for connecting. Connecting rods made of fiber composite material have been known for many years. Such connecting rods are used preferably, but not exclusively, in aerospace. Connecting rods of aircraft and spacecraft, such as airplanes, rotary-wing aircraft, airships, unmanned aviation systems, rockets, and satellites, are loaded predominantly axially by both compressive forces and tensile forces.

When fiber reinforced tubes are used, the fundamental problem of introducing forces into this structure frequently exists. Generally, metallic threaded elements that are set into the tubes are used for this purpose. There are a variety of solutions for the problematic joining of metal elements and fiber reinforced tubes. Struts of this nature with tubular bodies made of fiber composite material are distinguished in particular by their low weight as compared to metallic struts.

It is customary for the force introduction elements at the end of such struts to be made of metal. In most cases, force introduction elements are used that are made of aluminum. Usually, these are integrally joined by adhesive means to the tubular body made of fiber composite material. The high weight of the metallic force introduction elements, the poor corrosion resistance, the labor-intensive quality control of the adhesive joint, and the associated high manufacturing costs are disadvantageous here. In rare cases, the force introduction elements are also made of plastics, in which case their low strength and their coefficient of thermal expansion that differs strongly from the fiber reinforced tube have adverse effects.

Specifically in aerospace applications, in which such struts are also referred to as braces, connecting rods, or tension-compression rods, the struts serve, in particular, for guidance and mechanical mounting or for support ("struts" or "tie rods"), are subjected to extreme temperature fluctuations, and must meet the highest quality standards. A strut may also be known as a tie rod. The primary direction of loading of such struts is in the longitudinal axis of the strut. Struts of this nature generally include an essentially tubular body at each end of which is located an element (force introduction element or insert) for mounting the strut.

Especially high demands are placed on such struts for the strength of the materials used simultaneously with low weight, for reproducibility and quality assurance, and also for corrosion resistance. Moreover, the struts must be extremely resistant to mechanical, thermal, and other environmental stresses. Depending on the installation space available in each case, there is sometimes a requirement to construct such struts with the largest possible outer diameter within a cylindrical installation space.

The increasing requirements for saving weight and costs are approaching the limits of the potential of known construction methods for struts with tubular bodies made of fiber composite materials.

Various solution concepts for a positive-locking and/or integral load introduction for fiber composite struts are already known from the prior art.

WO 2009/003207 A1 describes an arrangement for connection for absorbing and/or transmitting tensile and/or torsional forces. The force introduction element is surrounded, at least in sections, by a jacket element, wherein this element consists essentially of a fiber composite material. On at least one section of the force introduction element, projections are provided on its outer surface that faces the jacket element, which projections at least partially penetrate the jacket element.

Disadvantageous here is that the connection cannot be used optimally for the transmission of compressive forces. In addition, the outer surface of the force introduction element is used to adhere the element to the jacket element. As a result, a large outer surface is required.

From DE 10 2014 109 886 A1, a connecting section on a long-fiber fiber composite material component is known for connecting the fiber composite material component to a connector component, which connecting section has at least one fiber deflecting element in its interior for the purpose of creating a lightweight and stable connection. In this design, the long fibers run as a loop around the fiber deflecting element. The fiber deflecting element serves as a fastening projection for positive-locking introduction of force.

Disadvantageous here is the labor-intensive manufacturing process that is necessary to create a loop around the fiber deflecting element. In addition, it is not possible to achieve the largest possible outer diameter within a cylindrical installation space over the entire length of the strut without post-processing.

In patent document DE 10 2013 008 810 B4, a fiber composite tube with an insert element is described for positive-locking introduction of force. The insert element is surrounded by fiber composite material near the contour at a distance of 0 mm to 0.5 mm, measured radially starting at the outer contour of the insert element, wherein fibers in the region near the contour are oriented at an angle between 0° and ±40°, measured with respect to the longitudinal axis of the tube, and fibers in the region near the contour have a modulus of elasticity in the fiber direction of 60 GPa to 600 GPa, and the insert element is likewise surrounded by fiber composite material distant from the contour, wherein fibers in the region distant from the contour are oriented at an angle between ±41° and ±89°, measured with respect to the longitudinal axis of the tube, and the region distant from the contour begins at a distance of 0.5 mm, measured radially starting at the outer contour of the insert element, and fibers in the region distant from the contour have a modulus of elasticity in the fiber direction of 200 GPa to 700 GPa, wherein the fibers in the region near the contour have a lower modulus of elasticity than the fibers in the region distant from the contour.

Disadvantageous in this concept is the enlargement of the tube diameter in the region of the insert element.

DE 10 2013 018 970 B3 describes a fiber composite tube that is implemented nonmetallically as a whole, consists of a thin-walled and lightweight lost core in which the center segment of the lost core consists of fiber composite material, and is larger in the inner diameter than the force introduction elements so that the fiber composite tube tapers at the ends toward the central axis of the tube, and the force introduction segments are surrounded in a positive-locking manner for force transmission by the sheath made of fiber composite material.

In this solution, the taper of the tube body in the region of the force introduction segment is disadvantageous.

In published patent application DE 10 2016 007 663 A1, a tubular fiber composite body is described that is provided with a transition element. Its interior is provided with an internal thread, and the side facing the tubular fiber composite body has holes in which pins are placed, and a tolerance-compensating intermediate layer lies between the side of the transition element facing the tubular fiber composite body and the tubular fiber composite body, and a portion of the pins penetrates both the tolerance-compensating intermediate layer and the tubular fiber composite body over the entire wall thickness, and an attachment element connected to the tubular fiber composite body through a transition element is steplessly adjustable in length by means of a thread.

The additional use of pins and the labor-intensive manufacturing process associated therewith for achieving a positive-locking load introduction are disadvantageous here.

DE 10 2017 003 024 A1 describes an already prefabricated fiber plastic composite tube for transmission of tensile and compressive forces, in particular, which tube is provided with a tube terminating element, and an inner element has a convex projection on its outer surface, and the fiber plastic composite tube has an indentation on its inner surface, the angle between the longitudinal axis of the tube and the outer contour of the inner element, measured in degrees, is a minimum of 1° and a maximum of 65° so that, at least under tensile loading, a frictional connection is produced with the creation of a normal force on the surfaces in contact with one another.

The introduction of force presented in this patent requires additional processing of the fiber composite tube. In addition, the tube does not have the largest possible outer diameter within a cylindrical installation space over the entire length of the strut.

SUMMARY OF THE INVENTION

The invention concerns a fiber composite strut that has an insert connected to a fiber composite hollow structure, such as a fiber plastic composite hollow structure. In certain embodiments, the fiber composite hollow structure is made at least of matrix material and fibers, and the insert has at least one undercut. The fiber composite hollow structure engages this undercut. In further embodiments, an outer region of the fiber composite hollow structure also has at least one undercut, and this undercut is at least partially filled with a fiber composite jacket, such as a fiber plastic composite jacket. In additional embodiments, an inner region of the fiber composite hollow structure has, at least in one subregion, a core connected thereto.

In certain embodiments, the fiber composite hollow structure comprises a fiber plastic composite material. In other embodiments, the fiber composite jacket comprises a fiber plastic composite material. In yet other embodiments of the invention, the core comprises a fiber plastic composite material.

Additionally, in certain embodiments of the invention, the insert is provided with an internal thread. In further embodiments, the internal thread is a round, trapezoidal, buttress, or a triangular thread.

In certain embodiments, the outermost diameter of the fiber composite jacket is within the outermost diameter of the fiber composite strut.

In some embodiments, the fiber composite hollow structure comprises more than 45 percent by volume a fiber constituent wherein the fiber constituent comprises predominantly continuous fibers.

In certain embodiments, the fiber composite strut comprises a fiber composite material comprising glass fibers and/or ceramic fibers and/or carbon fibers and/or basalt fibers and/or plastic fibers in conjunction with a thermoplastic and/or thermoset material.

In other embodiments, the insert is additionally connected to the fiber composite hollow structure by adhesive bonding.

In further embodiments, the insert comprises metallic materials and/or ceramic materials and/or short-fiber reinforced plastics and/or non-reinforced plastics.

In some embodiments, the fiber orientation of the fiber composite hollow structure is between 0° and 45° to a central axis of the fiber composite strut.

In further embodiments, the fiber orientation of the core is between 0° and 90° to a central axis of the fiber composite strut.

In certain embodiments, a core is made of a polymer and/or a polymeric foam.

In further embodiments, a fiber composite jacket has a fiber orientation between 70° and 90° to a central axis of the fiber composite strut.

In a particular embodiment, the insert is connected to the hollow structure as a positive-locking load introduction by way of fitting an undercut of an insert with an undercut of the fiber composite hollow structure at an inner diameter of the fiber composite hollow structure.

In some embodiments, any of a fiber composite hollow structure, core, or a fiber composite jacket comprises continuous glass fibers, carbon fibers, basalt fibers, ceramic fibers, and/or plastic fibers in conjunction with an epoxy resin, phenolic resin, polyester resin, and/or vinyl ester resin, or a thermoplastic such as PP, PA, ABS, PEI, PPS, or PEEK matrix.

In a particular embodiment, the fiber composite strut is rod-shaped.

In further embodiments, the fiber composite strut has an outermost diameter over a length of the strut that is 85-99% the size of a diameter of an installation space of the strut. In certain embodiments, the outermost diameter is over the length of a force introduction region and a center region of the fiber composite strut. In further embodiments, the outermost diameter is over the entire length of the fiber composite strut.

DETAILED DESCRIPTION OF THE INVENTION

Figure 1:
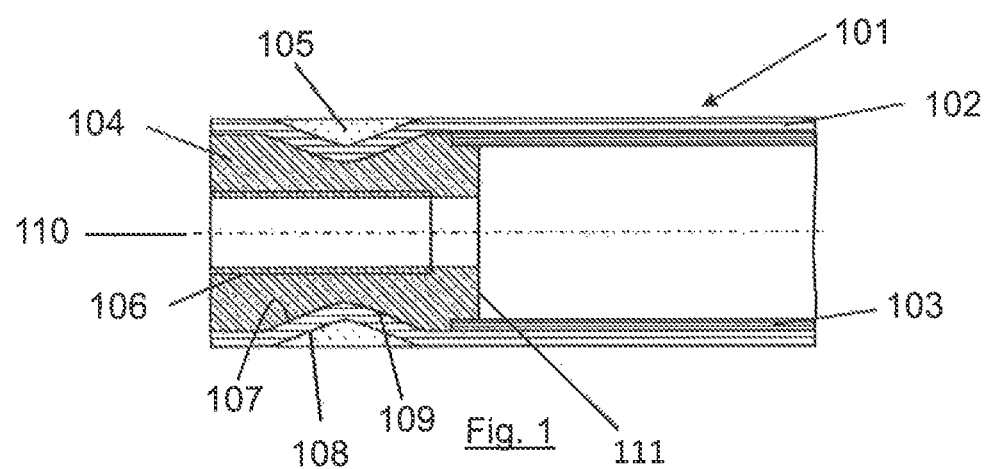
FIG. 1 illustrates a cross-sectional profile of a fiber composite strut (101) of the invention, comprising a core (103). The core (103) in this embodiment may support the fiber composite hollow structure (102) during the manufacturing process of the hollow structure.

The terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

When fiber reinforced tubes are used, a fundamental problem of introducing forces into this structure frequently exists. Depending on the installation space available in each case, there is sometimes a requirement to construct such struts with a largest possible outer diameter within, e.g., a cylindrical installation space. Accordingly, a largest possible outer diameter of a strut is that which is limited only by, e.g., a cylindrical installation space to allow for the strut to be introduced within the cylindrical space.

The instant invention herein provides a fiber composite structure with a largest possible outer diameter over a length, such as the entire length, of the fiber composite structure within a cylindrical installation space. In certain embodiments, the largest possible outer diameter of the fiber composite structure within the cylindrical installation space is implemented over the force introduction region or the length of an insert, and over the center region or the region comprising a core, of the fiber composite structure, by which means the stated disadvantages of the prior art can be overcome. By way of example, by having a largest possible outer diameter over the whole length of a fiber composite structure, such as a fiber composite strut, greater buckling resistance is achieved. Additionally, lower production costs are achieved through, e.g., the absence of post-processing of the strut and its outer diameter.

In certain embodiments, the outer diameter of a strut of the instant invention can be between 10 mm and 80 mm. In this embodiment, for example, if the installation space is 70 mm in diameter, the outermost diameter of the strut may be about 65 mm. However, it would be recognized in the art that these exact figures could vary depending, in part, on the deflection during compression load and/or the rod length. For example, where the installation space may be 70 mm in diameter, the outermost diameter of the strut may be between 67 mm and 63 mm. Or the installation space may be 50 mm in diameter, and the outermost diameter of the strut could be between 48 mm and 43 mm as a largest possible outer diameter depending upon, e.g., the deflection and/or the rod length. Otherwise stated, and by non-limiting example, an outermost diameter of a strut of the instant invention may be approximately 85-99.9% the size of the diameter of an installation space.

In some embodiments, the outermost diameter of a strut of the invention is 85%, 86%, 87%, 88%, 89%, 90%, 91%, 92%, 93%, 94%, 95%, 96%, 97%, 98%, 99%, or 99.9% the size of the diameter of the installation space for the strut, and values therebetween such as 85.5% and 90.5%. In certain embodiments, the outermost diameter is between 90-99.9%, 90-99%, 90-98%, 90-97%, 90-96%, 90-95%, 90-94%, 90-93%, 90-92%, 90-91%, or 90-90.5% the size of the diameter of the installation space for the strut, and values therebetween such as 90-96.5% or 91-99.9%. Thus, a strut of the invention has a largest possible outer diameter whilst maintaining an ability to fit within, e.g., a cylindrical installation space.

As shown in FIG. 1, an object of the invention is attained by means of an insert (104) connected to a fiber composite hollow structure (102), wherein the hollow structure (102) engages an undercut (107) of the insert (104), wherein the outer region of the fiber composite hollow structure (102) likewise has an undercut (108) and this undercut is filled with a fiber composite jacket (105).

Figure 2:
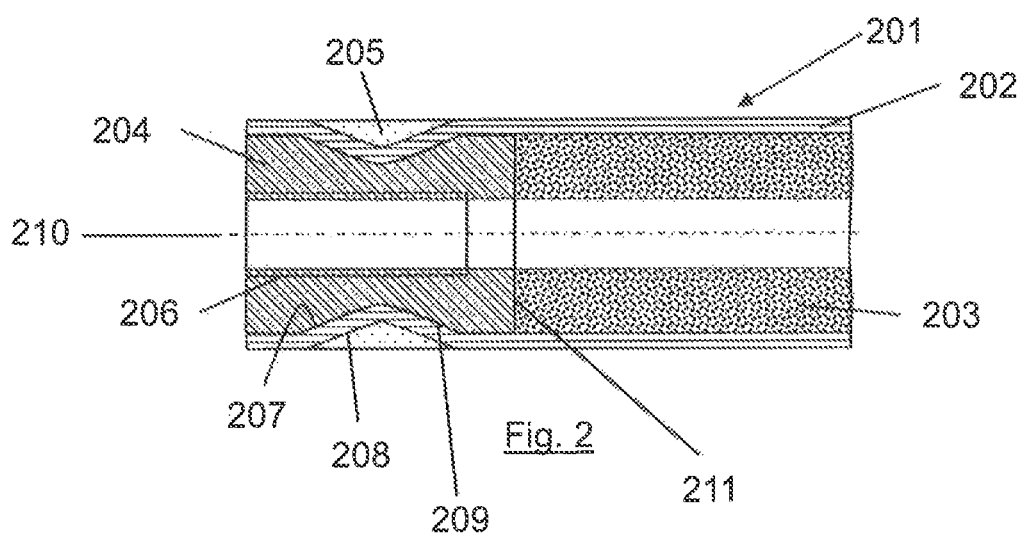
FIG. 2 illustrates a cross-sectional profile of a fiber composite strut (201) of the invention, comprising a core (203). The core (203) in this embodiment may support the fiber composite hollow structure (202) during the manufacturing process of the hollow structure.

As shown in FIG. 2, an object of the invention is attained by means of an insert (204) connected to a fiber composite hollow structure (202), wherein the hollow structure (202) engages an undercut (207) of the insert (204), wherein the outer region of the fiber composite hollow structure (202) likewise has an undercut (208) and this undercut is filled with a fiber composite jacket (205).

Such fiber composite struts may be used in aircraft or spacecraft, and in this context are loaded predominantly axially by both compressive forces and tensile forces.

The invention further relates to the provision of a positive-locking load introduction for rod-shaped fiber composite structures. In certain embodiments, as shown in FIG. 1, insert (104) is connected to the hollow structure (102) as a positive-locking load introduction by way of fitting the undercut (107) of the insert (104) with the undercut (109) of the hollow structure (102). Similarly, in FIG. 2, insert (204) is connected to the hollow structure (202) as a positive-locking load introduction by way of fitting the undercut (207) of the insert (204) with the undercut (209) of the hollow structure (202).

In embodiments of the invention, an insert has a smaller outermost diameter than the outermost diameter of a fiber composite hollow structure. In one embodiment, the fibers of the fiber composite hollow structure of a strut of the invention are oriented at an angle of 0° to 45° to the central axis of the strut. As a result of the application of a fiber composite jacket in the region of an undercut of the insert and an undercut of the hollow structure, or multiple undercuts of the insert and hollow structure, the fibers of the fiber composite hollow structure lie along the undercut(s) of the insert and along the undercut(s) of the hollow structure in a precisely fitting manner. In certain embodiments, the fiber orientation of the fiber composite jacket is between 70° and 90° to the central axis of the fiber composite strut. The central axis might also be otherwise known as a chain line. In embodiments of the invention, the diameter of the fiber composite jacket is within the outermost diameter of the strut.

How a fiber lies along the undercut of the insert or hollow structure can depend on, e.g., the matrix of the jacket and/or the composite hollow structure. In certain embodiments, the matrix of the jacket and/or the composite hollow structure is a thermoset plastic or thermoplastic. In some embodiments, the jacket is a fiber plastic composite jacket, which forces the fibers of the composite hollow structure to lie along the undercut(s) of the insert and along the undercut(s) of the hollow structure in a precisely fitting manner by putting high tension on the fibers of the jacket during the manufacturing process of the strut.

Additionally, in certain embodiments, the undercut(s) of the insert and undercut(s) of the hollow structure are substantially continuous around the diameter of the strut. In further embodiments, the undercut(s) of the insert and undercut(s) of the hollow structure are in a parallel position or a substantially parallel position to one another. In yet other embodiments, the undercut(s) of the insert and undercut(s) of the hollow structure achieve a positive locking of the strut through precise fitting with one another. In further embodiments, the undercut(s) of the insert lies adjacent to the undercut(s) of the hollow structure at an inner diameter of the hollow structure.

In certain embodiments, the insert can be additionally connected to the fiber composite hollow structure by adhesive bonding.

In other embodiments, a connecting rod according to the invention relates, for example, but not exclusively, to a force introduction element for a fiber reinforced, tubular component in which a strut with a largest possible outer diameter within a cylindrical installation space is achieved. The insert may have, for example, an internal thread to screw in force introduction elements. Examples of suitable force introduction elements include a ball bearing, a fork end, and a standard rod end. Additionally, all known types of internal thread can be used as the internal thread, including special thread forms that may be used as well. By way of example, round thread, trapezoidal thread, buttress thread, and triangular thread are known internal thread types that may be used.

Further, as used herein, the term "core" relates to a core made from materials, including but not limited to plastic composite materials and/or foam materials. In embodiments of the invention, the core comprises a part of the strut after manufacturing, e.g., the core is not removed from the strut after manufacturing. In some embodiments, the core comprises an innermost diameter of the strut. Generally, a core is used to supply a base to which the winding of a composite, such as a composite hollow structure, is applied. The core sets an inner diameter of the wound composite hollow structure. As such, in certain embodiments, a core acts as a mandrel, e.g., when manufacturing a composite strut of the invention. Depending upon the shape of the composite hollow structure made, the composite hollow structure may or may not be able to slide off of the core. As an example of the instant invention, and especially in embodiments where a composite hollow structure is unable to slide off a core, a foam core or composite core is used that is lightweight, but also provides enough support for the winding operation.

In certain embodiments, a composite hollow structure of the invention may be made by placing a core and insert on a winding mandrel. The core and insert are placed in a position for manufacturing the desired composite hollow structure. After which, winding is done by winding the composite hollow structure on top of the core and the insert. Accordingly, the composite hollow structure is manufactured. Then, one or more jackets are wound. Concerning, e.g., a thread, the thread may be machined after the winding process, but it may also be machined into the insert before the winding process.

Moreover, in certain embodiments, the region between the core and the insert can be such where the core is mounted on the sleeve or a portion of the sleeve of the insert. In other embodiments, the posterior end surface of an insert and the anterior end surface of a core lie adjacent to one another, e.g., face to face. Further, in embodiments of the invention, the area or space interior to the insert and/or core is hollow, that is, it is empty space or a void. In certain embodiments of the invention, a portion or all of the area or space interior to the insert is filled upon the introduction of a force introduction element.

Continuous glass fibers, carbon fibers, basalt fibers, ceramic fibers, and/or plastic fibers in conjunction with a plastic, such as, but not exclusively, epoxy resin, phenolic resin, polyester resin, and/or vinyl ester resin, or a thermoplastic such as PP (polypropylene), PA (polyamide or nylon plastic), ABS (acrylonitrile butadiene styrene), PEI (polyetherimide), PPS (polyphenylene sulfide), or PEEK (polyether ether ketone) matrix, can be used, for example, for a fiber plastic composite hollow structure, a fiber plastic composite core, and/or a fiber plastic composite jacket.

Metallic materials such as, for example, aluminum, titanium, or steel, and/or ceramic materials and/or short-fiber reinforced plastics and/or non-reinforced plastics may be used as the material for an insert.

The invention is explained in detail below on the basis of exemplary embodiments, FIG. 1 depicts a cross-sectional profile (side view) representation of a section of a fiber composite strut (101) made of a composite hollow structure (102), for example, a fiber plastic composite hollow structure, with an undercut (109) at an inner diameter of the hollow structure (102) and an undercut (108) at an outer diameter of the hollow structure (102); a core (103) made, for example, of a fiber plastic composite material; an insert (104) with internal thread (106) and undercut (107); and a jacket (105), for example a fiber plastic composite jacket. The insert (104) has an edge (111) over which the core (103) is mounted; the core (103) is mounted on a sleeve area, or an outer perimeter, of insert (104). Both the core (103) and insert (104) are adjacent the inner surface of the composite hollow structure (102). The central axis (110) of the strut (101) is also shown. The fiber orientation of the core (103) can be between 0° and 90° to the central axis (110) of the fiber composite strut (101). The core (103) can also preferably, but not exclusively, transmit compressive loads and/or tensile loads.

FIG. 2 depicts a cross-sectional profile (side view) representation of a section of a fiber composite strut (201), comprising a composite hollow structure (202), for example, a fiber plastic composite hollow structure, with an undercut (209) at an inner diameter of the hollow structure (202) and an undercut (208) at an outer diameter of the hollow structure (202); a core (203); an insert (204) with internal thread (206) and undercut (207); and a jacket (205), for example, a fiber plastic composite jacket. Any type of plastic is possible as a material for the core (203). For example, the core (203) in this embodiment can be made of a polymer or a polymeric foam material. The insert (204) has an edge (211). The core (203) is adjacent the insert edge (211) such that the core (203) and insert (204) are positioned face to face. Both the core (203) and insert (204) are adjacent the inner surface of the composite hollow structure (202). The central axis (210) of the strut (201) is also shown.

Figure 3:
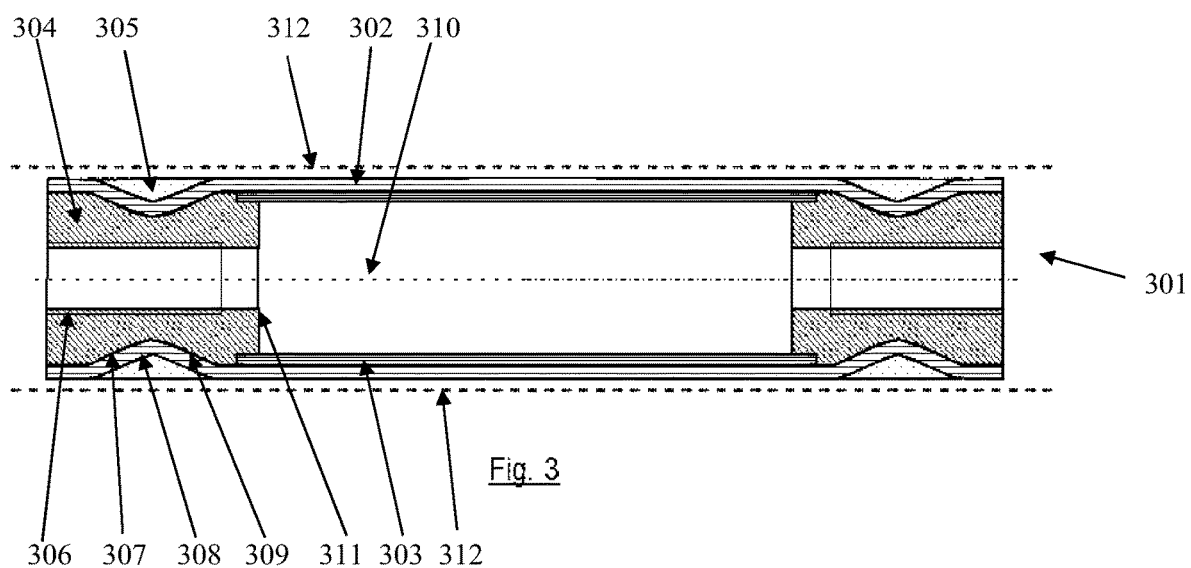
FIG. 3 illustrates a cross-sectional profile of a fiber composite strut (301) of the invention within an installation space (312).

FIG. 3 depicts a cross-sectional profile (side view) representation of a fiber composite strut (301) within an installation space (312). The fiber composite strut (301) is made of a composite hollow structure (302), with an undercut (309) at an inner diameter of the hollow structure (302) and an undercut (308) at an outer diameter of the hollow structure (302); a core (303); an insert (304) with internal thread (306) and undercut (307); and a jacket (305). The insert (304) has an edge (311) over which the core (303) is mounted; the core (303) is mounted on a sleeve area, or an outer perimeter, of insert (304). Both the core (303) and insert (304) are adjacent the inner surface of the composite hollow structure (302). The central axis (310) of the strut (301) is shown.

Modifications to the above would be obvious to those of ordinary skill in the art, but would not bring the invention so modified beyond the scope of the present invention. The claims to follow should be construed to cover such situations.

The invention claimed is:

1. A fiber composite strut comprising:
   (i) an insert connected to a fiber composite hollow structure, wherein the fiber composite hollow structure is made at least of a matrix material and fibers, the insert has at least one undercut, and the fiber composite hollow structure engages this undercut,
   (ii) an outer region of the fiber composite hollow structure likewise has at least one undercut and this undercut is at least partially filled with a fiber composite jacket, and
   (iii) an inner region of the fiber composite hollow structure has, at least in one subregion, a core connected thereto, wherein the core sets an inner diameter of the fiber composite hollow structure.

2. The fiber composite strut according to claim 1, wherein the fiber composite hollow structure comprises a fiber plastic composite material.

3. The fiber composite strut according to claim 1, wherein the fiber composite jacket comprises a fiber plastic composite material.

4. The fiber composite strut according to claim 1, wherein the core comprises a fiber plastic composite material.

5. The fiber composite strut according to claim 4, wherein a fiber orientation of the core is between 0° and 90° to a central axis of the fiber composite strut.

6. The fiber composite strut according to claim 1, wherein a fiber orientation of the fiber composite hollow structure is between 0° and 45° to a central axis of the fiber composite strut.

7. The fiber composite strut according to claim 1, wherein the insert comprises an internal thread.

8. The fiber composite strut according to claim 7, wherein the internal thread is selected from the group consisting of: a round thread, a trapezoidal thread, a buttress thread, and a triangular thread.

9. The fiber composite strut according to claim 1, wherein an outermost diameter of the fiber composite jacket is within an outermost diameter of the fiber composite strut.

10. The fiber composite strut according to claim 1, wherein the fiber composite hollow structure comprises more than 45 percent by volume a fiber constituent, wherein the fiber constituent comprises predominantly continuous fibers.

11. The fiber composite strut according to claim 1, comprising a fiber composite material comprising glass fibers and/or ceramic fibers and/or carbon fibers and/or basalt fibers and/or plastic fibers in conjunction with a thermoplastic and/or thermoset material.

12. The fiber composite strut according to claim 1, wherein the insert is additionally connected to the fiber composite hollow structure by adhesive bonding.

13. The fiber composite strut according to claim 1, wherein the insert comprises metallic materials and/or ceramic materials and/or non-reinforced plastics.

14. The fiber composite strut according to claim 1, wherein the core is made of a polymer or a polymeric foam.

15. The fiber composite strut according to claim 1, wherein the fiber composite jacket has a fiber orientation between 70° and 90° to a central axis of the fiber composite strut.

16. The fiber composite strut according to claim 1, wherein the insert is connected to the fiber composite hollow structure as a positive-locking load introduction by way of fitting the undercut of the insert with an undercut of the fiber composite hollow structure at an inner diameter of the fiber composite hollow structure.

17. The fiber composite strut according to claim 1, wherein any of the fiber composite hollow structure, core, or the fiber composite jacket comprises continuous glass fibers, carbon fibers, basalt fibers, ceramic fibers, and/or plastic fibers in conjunction with an epoxy resin, phenolic resin, polyester resin, and/or vinyl ester resin, or a thermoplastic comprising PP, PA, ABS, PEI, PPS, or PEEK matrix.

18. The fiber composite strut according to claim 1, wherein the fiber composite strut is rod-shaped.

19. The fiber composite strut according to claim 1, wherein the fiber composite strut has an outermost diameter over a length of the strut that is 85-99% the size of a diameter of an installation space of the fiber composite strut.

20. The fiber composite strut according to claim 19, wherein the outermost diameter is over the length of the insert and a center region of the fiber composite strut.

21. The fiber composite strut according to claim 20, wherein the outermost diameter is over the entire length of the fiber composite strut.

* * * * *